United States Patent [19]
Okada

[11] Patent Number: 4,577,251
[45] Date of Patent: Mar. 18, 1986

[54] MAGNETIC DISC CASSETTE HAVING DISC FLATTENING MEANS

[75] Inventor: Shinichi Okada, Chichibu, Japan

[73] Assignee: Canon Denshi Kabushiki Kaisha, Saitama, Japan

[21] Appl. No.: 473,320

[22] Filed: Mar. 8, 1983

[30] Foreign Application Priority Data

Mar. 12, 1982 [JP] Japan ................................. 57-38047
Mar. 12, 1982 [JP] Japan ................................. 57-38048

[51] Int. Cl.⁴ ...................... G11B 25/04; G11B 23/02
[52] U.S. Cl. ...................................... 360/133; 360/99; 360/128
[58] Field of Search ..................................... 360/97-99, 360/86, 128, 133, 131-132

[56] References Cited

U.S. PATENT DOCUMENTS

| | | | |
|---|---|---|---|
| 3,864,755 | 2/1975 | Hargis | 360/133 |
| 4,038,693 | 6/1977 | Huffine et al. | 360/99 |
| 4,149,207 | 4/1979 | Porter, Jr. et al. | 360/133 |
| 4,301,486 | 11/1981 | Brown et al. | 360/133 |
| 4,445,157 | 4/1984 | Takahashi | 360/133 |

*Primary Examiner*—Stuart N. Hecker
*Assistant Examiner*—David J. Severin
*Attorney, Agent, or Firm*—Spencer & Frank

[57] ABSTRACT

A cassette for accommodating a magnetic recording medium which includes a pressing member adjacent a head window pressing the recording/reproducing surface of a magnetic recording medium thereby flattening its surface. Spacing loss between the magnetic disc and the magnetic head and track deviation error are prevented thereby permitting precise recording and reproducing operations.

9 Claims, 9 Drawing Figures

MAGNETIC DISC CASSETTE HAVING DISC FLATTENING MEANS

BACKGROUND OF THE INVENTION

1. FIELD OF THE INVENTION

The present invention relates to a cassette for accommodating a magnetic recording medium. More particularly, it relates to a cassette for stably positioning a magnetic recording medium, such as a magnetic disc sheet in the form of a floppy disc, which is accommodated in the cassette.

2. DESCRIPTION OF THE PRIOR ART

One prior art example of a cassette or jacket for accommodating a magnetic recording medium is shown in FIG. 1. In FIG. 1, the cassette which is denoted by reference numeral 1, is in the form of a flat case or member consisting of a pair of cassette halves 1a, defining a cavity therebetween. The halves 1a each have a substantially rectangular shape and are made of a synthetic resin. The cassette 1 accommodates a magnetic disc 2 having a central circular spindle drive hole 2a, the disc rotating within the cavity about an axis normal to the surfaces of the cassette halves 1a. A window or opening 3 is formed in the central portion of the cassette 1, the opening 3 being concentric with the hole 2a and having a larger diameter than the hole 2a.

The cassette 1 has a head window or opening 4 which exposes the magnetic disc 2 over a given length in the radial direction of the disc. The head window 4 is positioned so that a magnetic head located within a magnetic recording/reproducing apparatus projects into the window 4 when the cassette 1 is loaded into the magnetic recording/reproducing apparatus. The magnetic head cooperates with the magnetic disc 2 to selectively record information on the disc and to reproduce information previously impressed on the disc. A center cone, which functions as a disc clamp, and a spindle, which acts as a driving mechanism of the magnetic recording/reproducing apparatus, engage each other through the hole 2a and opening 3.

A liner (not illustrated) is attached to the inner surface of the cassette 1 in order to prevent the magnetic disc 2 from contacting directly the cassette 1 and causing damage to the magnetic disc 2.

FIG. 2 illustrates a cassette for accommodating a magnetic recording medium which is an improvement over that illustrated in FIG. 1. In FIG. 2, a movable head shutter 5 is provided inside the cassette 1 behind the head window 4. The shutter 5 comprises a plate, having its surfaces parallel to the disc 2, which covers the entire area of head window 4.

A pin 6 projects from a surface of the shutter 5 and extends through a guide slot 7 in the cassette half 1a, the slot 7 being located in the vicinity of the head window 4 between the window 4 and the opening 3 of the cassette half 1a. The pin 6 is slidable along the guide slot 7 so that the window 4 can be opened or closed by the head shutter 5, shutter 5 being moved by sliding the pin 6 along the guide slot 7 with the use of a fingertip or suitable tool.

Therefore, if the head shutter 5 is moved by the pin 6 to a position where the head window 4 is closed when the cassette 1 is not in use, the invasion of dust into the inside of the cassette 1 through the head window 4, or the direct contact of a fingertip of an operator with the magnetic disc 2, are prevented. Accordingly, the magnetic disc 2 is kept clean and without scratches or other damage to its surface.

The cassette halves 1a which comprise the cassette 1 are usually made of a relatively rigid material such as a rigid synthetic resin. The magnetic disc 2, which is accommodated in the cassette 1 and rotates in a given direction, consists of a base comprising a very thin flexible material that is easily subjected to elastic deformation. The base material can be a synthetic resin, and a coating of magnetic material is applied to the base.

As a result, when the center cone is inserted into the opening 2a and the driving spindle for transmitting a rotating force to the disc 2 is engaged with the center cone so as to hold the disc 2 between the cone and the driving spindle during a recording/reproducing operation, the magnetic disc 2 is distorted when loaded or undulated while rotating. It may also happen that the magnetic disc 2 is deformed by the magnetic head pressing on the disc.

Such deformation causes a spacing loss between the magnetic head and the magnetic disc 2, and a spacing or deviation of the tracks on the magnetic disc 2 during the recording/reproducing operation. Consequently, it is very difficult to carry out recording with a high recording density, and the reliability of the magnetic recording/reproducing apparatus is deteriorated.

SUMMARY OF THE INVENTION

It is an object of the invention to provide a cassette for accommodating a magnetic recording medium which does not have the disadvantages of the conventional cassette described above, and which can provide high-density recording without spacing loss or deviation of the tracks, even if distortion or deformation is caused on the magnetic recording medium. In order to achieve this object, according to the present invention, a member which resiliently presses the magnetic recording medium in the vicinity of the head window is provided on the cassette for the purpose of flattening the recording/reproducing surface of the magnetic recording medium.

In a preferred embodiment of the invention, the pressing member is arranged near a side edge of the head window of the cassette. More specifically, the pressing member is located adjacent the edge of the window which a point on the magnetic recording medium, rotating in a given direction, would reach immediately before it enters the head window.

In another embodiment of the invention, the pressing member is provided on the inner surface of a head shutter for opening or closing the head window of the cassette.

The pressing member may be made of a resilient material such as felt, and is preferably a thick-walled portion integrally formed as a part of the head shutter. The pressing member can be provided on both side edges of the head window, and the magnetic recording medium may be a floppy disc.

DETAILED DESCRIPTION OF THE PREFERRED EMBODIMENTS

Figure 1:
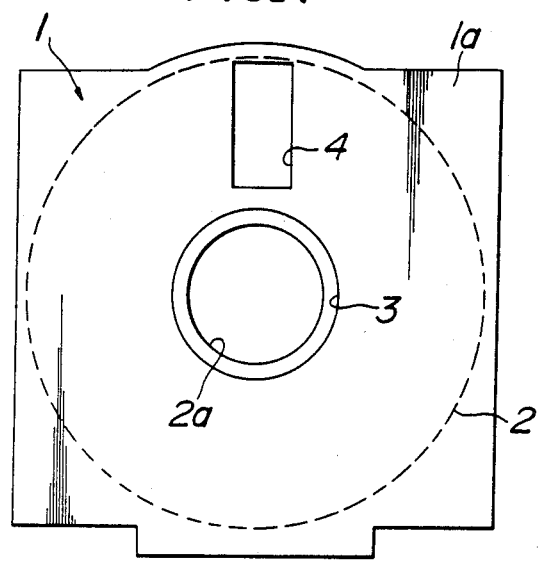
FIG. 1 is a plan view showing a conventional cassette for accommodating a magnetic recording medium.
Figure 3:
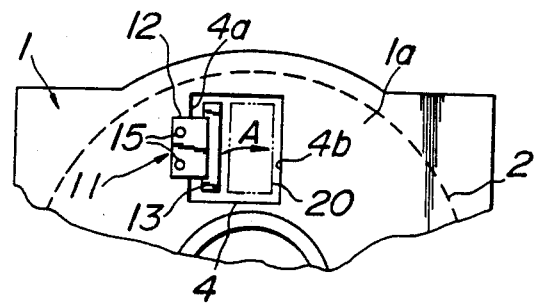
FIG. 3 is a fragmentary plan view of a cassette for accommodating a magnetic recording medium according to the present invention.
Figure 4:
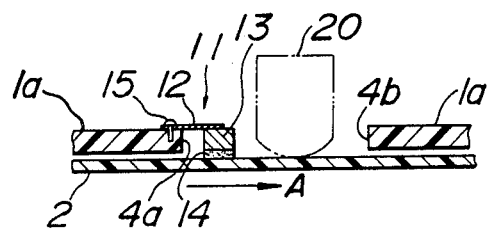
FIG. 4 is an enlarged sectional view showing details of the pressing member applied to the cassette shown in FIG. 3.

FIGS. 3 and 4 show a portion of a cassette or jacket for accommodating a recording medium, such as a floppy disc, according to the present invention. In these figures, parts corresponding to parts shown in FIG. 1 are depicted by the same reference numerals.

In FIG. 3, the magnetic disc 2 rotates within the cassette 1 in the direction of the arrow A so as to pass below the head window 4. A pressing member 11 is secured to the half 1a of the cassette 1, in which the window 4 is located, at the upstream edge 4a of the window; that is, at the edge of the window which a point on the magnetic disc 2, rotating in the direction A, would reach just before passing below the window.

The pressing member 11 consists of a supporting element 12 having one edge fixed to the side edge 4a of the head window 4 and a pressing piece 13 made of a cushioning material such as felt. Alternatively, the pressing piece 13 may be made of metal and have a cushioning piece such as felt piece 14 (FIG. 4) attached to its side opposite the supporting member 12. The pressing piece 13 has a relatively narrow width and a length substantially equal to the length of the head window 4, the piece 13 extending approximately in the radial direction of the recording medium. The supporting member 12 is resiliently elastic and stressed to push the pressing piece 13 against the recording/reproducing surface of the magnetic disc 2. Reference numeral 15 denotes a fastening member such as a pin which secures the supporting member 12 to the cassette 1 adjacent side edge 4a of the head window 4 of the cassette 1.

When the cassette 1 is loaded in the recording/reproducing apparatus so that the recording or reproducing operations can take place, a magnetic read/write head 20 enters the opening portion defined by the pressing piece 13 and the head window 4, and comes into contact with the recording/reproducing surface of the magnetic disc 2. The recording/reproducing surface of the disc is forcibly flattened by the pressing piece 13 just upstream from the area where the head contacts the magnetic disc 2. As a result, the magnetic disc 2 contacts the magnetic head 20 with its recording/reproducing surface in a flat condition, even if the portion of the magnetic disc 2 upstream from the side edge 4a is deformed or distorted.

Therefore, it is possible to obtain high density recording without causing a spacing loss between the magnetic head and the magnetic disc 2 or a deviation over the track.

Figure 5:
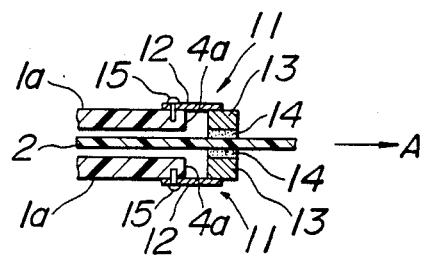
FIGS. 5 and 6 are enlarged sectional views showing other embodiments of the invention.

In another embodiment of the invention shown in FIG. 5, a window 4 is located in each half of the cassette, the two windows being opposite each other. A pressing member 11 is secured to each half 1a of the cassette 1 adjacent the side edges 4a of the window 4 which a point on the disc would reach before passing under the window. Consequently, both surfaces of the magnetic disc 2 are held between the two pressing members 11.

Figure 6:
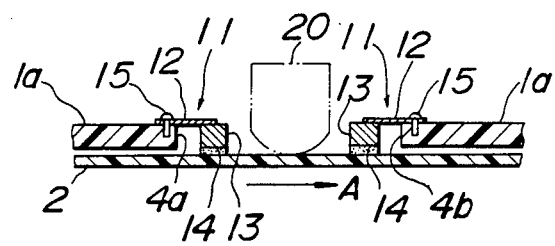

Alternatively, pressing members 11 may be provided, as shown in FIG. 6, adjacent both sides edges 4a and 4b of the head window 4, respectively, so that the pressing members 11 can more stably hold the magnetic disc 2.

Figure 2:
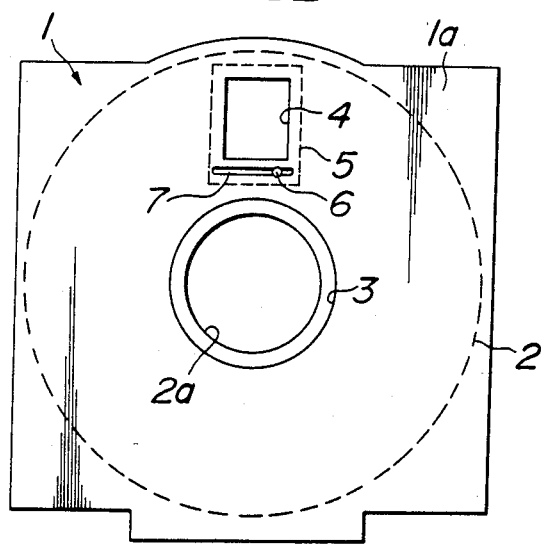
FIG. 2 is a plan view showing a cassette for accommodating a magnetic recording medium which is an improvement over that illustrated in FIG. 1.
Figure 7:
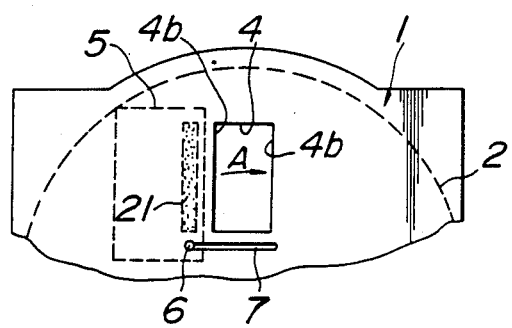
FIG. 7 is a fragmentary plan view showing another embodiment of a cassette for accommodating a magnetic recording medium according to the present invention.
Figure 8:
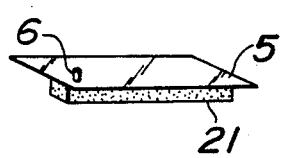
FIGS. 8 and 9 are enlarged perspective views of two embodiments of the pressing member applied to the cassette shown in FIG. 7.

FIGS. 7 and 8 show another embodiment of a cassette according to the present invention. In these figures, the parts corresponding to those shown in FIG. 2 are indicated by the same reference numerals.

In FIGS. 7 and 8, a pressing piece 21 is attached to the surface of the head shutter 5 which is opposite the surface thereof facing the inner surface of the cassette half 1a; that is, the pressing piece 21 is adjacent the surface of the magnetic disc 2 and presses on the disc. It is preferable that the pressing piece 21 have a length substantially equal to the length of the head window 4 in the radial direction of the magnetic disc 2 and that it be made of an elastic material, such as felt, to prevent scratches or other damage to the disc. The pressing piece 21 is located adjacent the side edge 4a of the head window 4 which a point on the magnetic disc 2, rotating in the direction A, would reach just before the disc 2 passes below the window 4.

With the pressing piece 21 in the described location and with the magnetic disc 2 rotating in the direction A, the magnetic disc 2 is pressed by the pressing piece 21 just before the magnetic disc 2 comes into contact with the magnetic head thereby flattening the disc. Thus, the deformation or distortion of the recording and reproducing surface of the magnetic disc 2 is removed thereby making the surface flat and placing the magnetic head in good contact with the magnetic disc 2 when recording and reproducing. Accordingly, it is possible to achieve high density recording without spacing loss or track deviation error.

Figure 9:
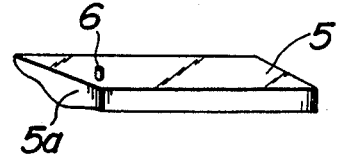

While in the embodiment shown in FIGS. 7 and 8, the pressing piece 21, which is made of an elastic material such as felt and formed separately, is firmly attached to the surface of the head shutter 5 adjacent the magnetic disc 2, the pressing piece 21 is not necessarily limited to such a structure. For instance, the pressing piece 21 may be an integral part of the head shutter 5 as shown in FIG. 9. In FIG. 9, the shutter 5 has a thick-walled or protrudent portion 5a having a convex surface on the side facing the magnetic disc 2, so that the portion 5a presses the magnetic disc 2. In this embodiment, it is preferable that the head shutter 5 be made of an elastic material such as plastic to prevent the magnetic disc 2 from being damaged or scratched by the portion 5a.

Summarizing, in accordance with the invention, a cassette for accommodating a magnetic recording medium is provided which has a pressing member positioned adjacent the window which receives the magnetic head. The pressing member elastically presses the sheet-like magnetic recording medium so that it comes into contact with the magnetic head to remove deformation and distortion of the medium by flattening the disc. Accordingly, spacing loss and track deviation errors are prevented permitting precise recording and reproducing with high density.

What is claimed is:

1. A cassette for accommodating a magnetic recording medium in the form of a thin disc, said cassette being adapted for insertion in a magnetic recording/reproducing apparatus having a magnetic head, comprising:

a case having first and second substantially flat surfaces defining a cavity therebetween wherein said disc is positioned for rotation in a given direction about an axis normal to said flat surfaces, at least one of said flat surfaces having a window therein for exposing a surface of said disc to said magnetic head, said window having first and second opposite edges; and a pressing member secured to a flat surface of said case adjacent an edge of said window and protruding into said window to resiliently press on a surface of said disc thereby flattening said surface, said pressing member including a pressing piece made of a cushioning material for contacting the surface of said disc and a resilient supporting member interposed between said case and said pressing piece for supporting said pressing piece and urging it against the surface of said disc.

2. A cassette as claimed in claim 1, wherein said pressing member is secured to said flat surface adjacent the first edge of said window, a given point on said magnetic disc reaching said first edge before passing under said window when said disc is rotated in said given direction.

3. A cassette as claimed in claim 2, which further includes a second pressing member secured to said flat surface adjacent the second edge of said window, said second pressing member including a second pressing piece made of a cushioning material for contacting the surface of said disc and a second resilient supporting member interposed between said case and said second pressing piece for supporting said second pressing piece and urging it against the surface of said disc, the given point on said magnetic disc reaching said second edge after passing under said window.

4. A cassette as claimed in claim 2, which further includes a second pressing member secured to a flat surface of said case and resiliently pressing the surface of said disc opposite the surface pressed by said first mentioned pressing member, said second pressing member including a second pressing piece made of a cushioning material for contacting the surface of said disc and a second resilient supporting member interposed between said case and said second pressing piece for supporting said second pressing piece and urging it against the surface of said disc, both of said pressing members pressing both surfaces of said disc thereby flattening the surfaces thereof.

5. A cassette for accommodating a magnetic recording medium in the form of a thin disc, said cassette being adapted for insertion in a magnetic recording/reproducing apparatus having a magnetic head, comprising:

a case having first and second substantially flat surfaces defining a cavity therebetween wherein said disc is positioned for rotation in a given direction about an axis normal to said flat surfaces, at least one of said flat surfaces having a window therein for exposing a surface of said disc to said magnetic head, said window having first and second opposite edges;

a shutter movably attached to said case for opening and closing said opening; and a pressing member secured to said shutter, said pressing member resiliently pressing a surface of said disc thereby flattening said surface.

6. A cassette as claimed in claim 5, wherein said pressing member is made of an elastic material.

7. A cassette as claimed in claim 5, wherein said pressing member includes a protrudent portion protruding toward said disc surface comprising an integral part of said shutter.

8. A cassette as claimed in claim 5, wherein said pressing member is located on a portion of said shutter which a given point on said magnetic disc reaches before passing under said window when said disc is rotated in said given direction and said shutter is in a position whereby said window is open.

9. A cassette as claimed in claim 8, which further includes a second pressing member secured to a flat surface of said case and resiliently pressing the surface of said disc opposite the surface pressed by said first mentioned pressing member, both of said pressing members pressing both surfaces of said disc thereby flattening the surfaces thereof.

* * * * *